United States Patent [19]

Guilino et al.

[11] Patent Number: 5,042,936

[45] Date of Patent: Aug. 27, 1991

[54] PROGRESSIVE OPHTHALMIC LENS

[75] Inventors: Günther Guilino; Herbert Pfeiffer; Helmut Altheimer, all of Munich, Fed. Rep. of Germany

[73] Assignee: Optische Werke G. Rodenstock, Munich, Fed. Rep. of Germany

[21] Appl. No.: 391,580

[22] PCT Filed: Nov. 25, 1988

[86] PCT No.: PCT/DE88/00730

§ 371 Date: Jul. 14, 1989

§ 102(e) Date: Jul. 14, 1989

[87] PCT Pub. No.: WO89/04986

PCT Pub. Date: Jun. 1, 1989

[30] Foreign Application Priority Data

Nov. 25, 1987 [DE] Fed. Rep. of Germany ....... 3739974

[51] Int. Cl.$^5$ .............................................. G02C 7/06
[52] U.S. Cl. ..................................... 351/169; 359/652
[58] Field of Search .............................. 351/168–172; 350/413

[56] References Cited

U.S. PATENT DOCUMENTS 3,610,924 10/1971 Sinai ................................ 351/169 X
4,073,579 2/1978 Deeg et al. ......................... 351/169

FOREIGN PATENT DOCUMENTS

| 39497 | 11/1981 | European Pat. Off. . |
| 291094 | 11/1988 | European Pat. Off. . |
| 2044639 | 3/1971 | Fed. Rep. of Germany . |
| 2439127 | 2/1975 | Fed. Rep. of Germany . |
| 3116524 | 8/1982 | Fed. Rep. of Germany . |
| 3331763 | 5/1985 | Fed. Rep. of Germany . |

Primary Examiner—Scott J. Sugarman
Attorney, Agent, or Firm—Antonelli, Terry, Stout & Kraus

[57] ABSTRACT

A progressive ophthalmic lens comprising a distance portion, the refractive power of which being designed for distance vision, a reading portion, the refractive power of which being designed for near vision, and an intermediate portion, in which the refractive power along the main line of vision at least partially increases continuously from the refractive power of the distance portion to the reading portion. A refractive index of the lens material varies along the main line of vision at least in the intermediate portion so as to at least partially contribute to the increase in refractive power and correction of aberrations.

18 Claims, 12 Drawing Sheets

| 0.0 | 2.0 | 4.0 | 6.0 | 8.0 | 10.0 | Y₁ |
|---|---|---|---|---|---|---|
| 0.0 | 0.0004 | 0.0015 | 0.0034 | 0.0060 |  | 32.0 |
| 0.0 | 0.0004 | 0.0016 | 0.0035 | 0.0062 | 0.0098 | 30.0 |
| 0.0 | 0.0004 | 0.016  | 0.0036 | 0.0065 | 0.0101 | 28.0 |
| 0.0 | 0.0004 | 0.0017 | 0.0037 | 0.0067 | 0.0104 | 26.0 |
| 0.0 | 0.0004 | 0.0017 | 0.0038 | 0.0068 | 0.0107 | 24.0 |
| 0.0 | 0.0004 | 0.0017 | 0.0039 | 0.0070 | 0.0110 | 22.0 |
| 0.0 | 0.0004 | 0.0018 | 0.0040 | 0.0072 | 0.0112 | 20.0 |
| 0.0 | 0.0005 | 0.0018 | 0.0041 | 0.0073 | 0.0114 | 18.0 |
| 0.0 | 0.0005 | 0.0019 | 0.0042 | 0.0074 | 0.0116 | 16.0 |
| 0.0 | 0.0005 | 0.0019 | 0.0042 | 0.0075 | 0.0118 | 14.0 |
| 0.0 | 0.0005 | 0.0019 | 0.0043 | 0.0076 | 0.0119 | 12.0 |
| 0.0 | 0.0005 | 0.0019 | 0.0043 | 0.0077 | 0.0120 | 10.0 |
| 0.0 | 0.0005 | 0.0019 | 0.0043 | 0.0076 | 0.0119 | 8.0 |
| 0.0 | 0.0005 | 0.0018 | 0.0041 | 0.0073 | 0.0115 | 6.0 |
| 0.0 | 0.0004 | 0.0016 | 0.0037 | 0.0066 | 0.0103 | 4.0 |
| 0.0 | 0.0003 | 0.0012 | 0.0026 | 0.0047 | 0.0073 | 2.0 |
| 0.0 | 0.0 | 0.0 | 0.0 | 0.0001 | 0.0003 | 0.0 |
| 0.0 | -0.0006 | -0.0026 | -0.0057 | -0.0099 | -0.0152 | -2.0 |
| 0.0 | -0.0019 | -0.0076 | -0.0168 | -0.0292 | -0.0444 | -4.0 |
| 0.0 | -0.0039 | -0.0153 | -0.0335 | -0.0576 | -0.0860 | -6.0 |
| 0.0 | -0.0061 | -0.0237 | -0.0513 | -0.0863 | -0.1256 | -8.0 |
| 0.0 | -0.0078 | -0.0302 | -0.0647 | -0.1074 | -0.1535 | -10.0 |
| 0.0 | -0.0089 | -0.0344 | -0.0732 | -0.1207 | -0.1712 | -12.0 |
| 0.0 | -0.0096 | -0.0371 | -0.0788 | -0.1295 | -0.1832 | -14.0 |
| 0.0 | -0.0102 | -0.0392 | -0.0832 | -0.1367 | -0.1933 | -16.0 |
| 0.0 | -0.0107 | -0.0414 | -0.0878 | -0.1440 | -0.2036 | -18.0 |
| 0.0 | -0.0114 | -0.0439 | -0.0931 | -0.1527 | -0.2157 | -20.0 |
| 0.0 | -0.0122 | -0.0471 | -0.0997 | -0.1633 | -0.2307 | -22.0 |
| 0.0 | -0.0133 | -0.0511 | -0.1081 | -0.1769 | -0.2496 | -24.0 |
| 0.0 | -0.0147 | -0.0564 | -0.1190 | -0.1944 | -0.2739 | -26.0 |
| 0.0 | -0.0165 | -0.0634 | -0.1335 | -0.2175 | -0.3057 | -28.0 |
| 0.0 | -0.0191 | -0.0732 | -0.1535 | -0.2488 | -0.3484 | -30.0 |
| 0.0 | -0.0230 | -0.0875 | -0.1822 | -0.2932 |  | -32.0 |

| 12.0 | 14.0 | 16.0 | 18.0 | 20.0 | 22.0 | $Y_1$ |
|---|---|---|---|---|---|---|
|  |  |  |  |  |  | 32.0 |
| 0.0141 |  |  |  |  |  | 30.0 |
| 0.0146 | 0.0199 | 0.0261 |  |  |  | 28.0 |
| 0.0150 | 0.0205 | 0.0269 | 0.0342 | 0.0424 |  | 26.0 |
| 0.0155 | 0.0211 | 0.0277 | 0.0351 | 0.0436 | 0.0529 | 24.0 |
| 0.0158 | 0.0216 | 0.0283 | 0.0360 | 0.0446 | 0.0543 | 22.0 |
| 0.0162 | 0.0221 | 0.0290 | 0.0368 | 0.0456 | 0.0555 | 20.0 |
| 0.0165 | 0.0225 | 0.0295 | 0.0375 | 0.0465 | 0.0566 | 18.0 |
| 0.0168 | 0.0229 | 0.0301 | 0.0382 | 0.0473 | 0.0575 | 16.0 |
| 0.0170 | 0.0233 | 0.0305 | 0.0387 | 0.0480 | 0.0584 | 14.0 |
| 0.0172 | 0.0235 | 0.0308 | 0.0391 | 0.0485 | 0.0590 | 12.0 |
| 0.0173 | 0.0236 | 0.0310 | 0.0393 | 0.0487 | 0.0592 | 10.0 |
| 0.0172 | 0.0234 | 0.0307 | 0.0390 | 0.0484 | 0.0588 | 8.0 |
| 0.0166 | 0.0226 | 0.0297 | 0.0377 | 0.0467 | 0.0568 | 6.0 |
| 0.0149 | 0.0203 | 0.0267 | 0.0339 | 0.0421 | 0.0513 | 4.0 |
| 0.0106 | 0.0146 | 0.0192 | 0.0246 | 0.0308 | 0.0377 | 2.0 |
| 0.0006 | 0.0011 | 0.0019 | 0.0030 | 0.0046 | 0.0067 | 0.0 |
| 0.0213 | -0.0281 | -0.0352 | -0.0425 | -0.0497 | -0.0563 | -2.0 |
| 0.0619 | -0.0808 | -0.1005 | -0.1200 | -0.1384 | -0.1544 | -4.0 |
| 0.1169 | -0.1485 | -0.1786 | -0.2048 | -0.2248 | -0.2364 | -6.0 |
| 0.1657 | -0.2029 | -0.2335 | -0.2540 | -0.2611 | -0.2519 | -8.0 |
| 0.1983 | -0.2370 | -0.2652 | -0.2790 | -0.2750 | -0.2503 | -10.0 |
| 0.2193 | -0.2598 | -0.2880 | -0.2999 | -0.2920 | -0.2615 | -12.0 |
| 0.2342 | -0.2768 | -0.3064 | -0.3188 | -0.3107 | -0.2791 | -14.0 |
| 0.2469 | -0.2918 | -0.3233 | -0.3372 | -0.3301 | -0.2991 | -16.0 |
| 0.2601 | -0.3077 | -0.3415 | -0.3573 | -0.3518 | -0.3220 | -18.0 |
| 0.2756 | -0.3264 | -0.3630 | -0.3812 | -0.3776 | -0.3494 | -20.0 |
| 0.2948 | -0.3494 | -0.3894 | -0.4106 | -0.4095 | -0.3833 | -22.0 |
| 0.3189 | -0.3783 | -0.4225 | -0.4473 | -0.4493 | -0.4256 | -24.0 |
| 0.3497 | -0.4150 | -0.4645 | -0.4938 | -0.4995 |  | -26.0 |
| 0.3897 | -0.4624 | -0.5184 |  |  |  | -28.0 |
| 0.4429 |  |  |  |  |  | -30.0 |
|  |  |  |  |  |  | -32.0 |

FIG. 6b

| $X_1$ IN MM | | | | | $Y_1$ |
|---|---|---|---|---|---|
| 24.0 | 26.0 | 28.0 | 30.0 | 32.0 | |
| | | | | | 32.0 |
| | | | | | 30.0 |
| | | | | | 28.0 |
| | | | | | 26.0 |
| | | | | | 24.0 |
| 0.0649 | | | | | 22.0 |
| 0.0663 | 0.0783 | | | | 20.0 |
| 0.0677 | 0.0798 | | | | 18.0 |
| 0.0688 | 0.0812 | 0.0948 | | | 16.0 |
| 0.0698 | 0.0824 | 0.0961 | | | 14.0 |
| 0.0705 | 0.0832 | 0.0971 | 0.1122 | | 12.0 |
| 0.0709 | 0.0836 | 0.0976 | 0.1127 | | 10.0 |
| 0.0704 | 0.0830 | 0.0969 | 0.1120 | 0.1283 | 8.0 |
| 0.0680 | 0.0803 | 0.0938 | 0.1084 | 0.1243 | 6.0 |
| 0.0615 | 0.0728 | 0.0851 | 0.0986 | 0.1133 | 4.0 |
| 0.0456 | 0.0544 | 0.0642 | 0.0750 | 0.0871 | 2.0 |
| 0.0096 | 0.0132 | 0.0179 | 0.0238 | 0.0311 | 0.0 |
| 0.0621 | -0.0664 | -0.0690 | -0.0692 | -0.0665 | -2.0 |
| 0.1671 | -0.1750 | -0.1770 | -0.1716 | -0.1573 | -4.0 |
| 0.2370 | -0.2245 | -0.1966 | -0.1512 | -0.0861 | -6.0 |
| 0.2236 | -0.1738 | -0.1003 | -0.0009 | -0.1261 | -8.0 |
| 0.2021 | -0.1283 | -0.0270 | -0.1037 | | -10.0 |
| 0.2059 | -0.1232 | -0.0114 | -0.1309 | | -12.0 |
| 0.2218 | -0.1366 | -0.0218 | | | -14.0 |
| 0.2419 | -0.1565 | -0.0410 | | | -16.0 |
| 0.2656 | -0.1806 | | | | -18.0 |
| 0.2942 | -0.2101 | | | | -20.0 |
| 0.3297 | | | | | -22.0 |
| | | | | | -24.0 |
| | | | | | -26.0 |
| | | | | | -28.0 |
| | | | | | -30.0 |
| | | | | | -32.0 |

PROGRESSIVE OPHTHALMIC LENS

DESCRIPTION

1. Field of the Invention

The present invention relates to a progressive ophthalmic lens having a distance portion, the refractive power of which being designed for distance vision, a reading portion, the refractive power of which being designed for near vision, and an intermediate portion, in which the refractive power along the main line of vision at least partially increases continuously from the refractive power of the distance portion to the reading portion.

2. State of the Art

The known progressive ophthalmic lenses as described above are made of a material having a uniform refractive index, attaining the increase in refractive power from the distant portion to the reading portion by means of appropriate design of one or both lens surfaces.

As the design of the surface of the state of the art ophthalmic lenses deviates very greatly from their spherical shape, their production and, in particular, the polishing of a surface cut "meridianwise" is difficult and often results in comparatively large discrepancies between the produced surface and the computed surface.

Furthermore, —at least in the case of a progressive surface—it is not possible to keep imaging errors and, in particular, astigmatism and distortion at a low level over the entire lens.

DESCRIPTION OF THE INVENTION

For this reason, the present invention proceeds from the concept to realize advantageous properties by means of a progressive ophthalmic lens having a changing refractive index. Ophthalmic lenses with a changing refractive index have been discussed numerous times in the literature in the field: reference hereto is made, by way of illustration, to the survey "Gradient Index Optics" by W. N. Charman (The Ophthalmic Optician, 1981, pp 72-84) as well as the literature cited therein.

As can be drawn from the aforecited article (p. 80, left column), hitherto ophthalmic lenses having a varying refractive index have been considered as a substitute for ophthalmic lenses having aspheric surfaces while possessing "similarly good" optical properties (p. 80, left column ff.). As yet there has been no known actual realization of a progressive ophthalmic lens having a changing refractive index.

This is probably due to the fact that progressive lens surfaces have a very complicated surface design. Thus, there seems to be a preconceived notion that a varying refractive index as an alternative for such a complicated surface design would result in a just as complicated refractive index function, which is technically not to be realized.

A key element of the present invention is that it was understood that it is possible to achieve such great advantages by using a varying refractive index in manufacturing lens surfaces with simplified production being the consequence thereof while maintaining overall comparable imaging properties.

Thus, the object of the present invention is to provide a progressive ophthalmic lens having a varying refractive index.

In accordance with the present invention it was understood that employing a varying refractive index yields the following possibilities:

The variation of the refractive index produces or enhances the increase in refractive power along a line following the curved line of vision or lying in a plane and being adjusted to the main line of vision.

Designated as main line of vision is that line on the front surface of the ophthalmic lens which connects the main points of peering through for vision in the distance and for reading and on which lie the points of penetration of the beams of vision for intermediate distances in the "straight ahead" direction. The main line of vision is an almost vertical line in the distance and reading portions and a sinous line in the intermediate section.

The utilization of a gradient medium corrects imaging errors lateral of the main meridian.

Assuming that the three effects "increase in refractive power along the main line of vision", "elimination of astigmatism along the main line of vision" and "lateral corrections" are chiefly partially or not borne by varying the refractive index yields $3^3 = 27$ possible combinations which all can be mathematically characterized.

However, a main element of the present invention is that it was understood that one essential production advantage is attained only if a refractive index of the lens material changing at least along the main line of vision in the intermediate section at least partially contributes to the increase in refractive power. By this means, namely, the differences in the radii of curvature of between the distance portion and the reading portion are decreased in such a manner that one, the processing of a lens blank tube having spherical boundary surfaces for the manufacture of a progressive surface is shortened; two, that the polishing process, which in the case of progressive ophthalmic lenses, according to the state of the art, essentially corresponds to that of a spherical lens, is simplified and its results are improved.

In accordance with a feature of the present invention, the refractive index n at least is a function $f(y)$, whereby the y axis is the vertical axis on said lens. That is, the variation of the refractive index basically follows the vertical, whereby the main line of vision deviating therefrom has a sinous course.

On the other hand, according to a further embodiment the refractive index n at least is a function $f(y')$, whereby the y' axis, compared to the vertical, is pitched according to the convergence of the pair of eyes when lowering the glance for the near vision. That is, the refractive index is a function of y', whereby the y' axis is pitched like in a plane main meridian in a conventional progressive ophthalmic lens corresponding to the convergence of a pair of eyes in peering from the distance to proximity.

In the further improvement of the ophthalmic lenses at least one surface of said ophthalmic lens is provided with intersecting lines y or y' = const, the radii of curvature of which vary for the correction of imaging errors. That is, the increase in refractive power from the distance portion to the reading portion is completely or partially produced by the variation of the refractive index, lateral corrections, however, being at least partially, usually predominantly, borne by the design of the surface. The only partial contribution of the surface design to the increase in refractive power, which determines the exterior shape, means that the thickness and the weight of the invented ophthalmic lens are more advantageous, i.e. are less, compared to a progressive ophthalmic lens made of homogeneous material. In addition, the nonuniform peripheral thickness can be designed substantially more evenly. The further embodiment relates to ophthalmic lenses taking the curved course of the main line of vision into consideration, whereas another further embodiment relates to ophthalmic lenses in which the course of the main line of vision is approximated by means of a "pitched" plane line.

Additionally, if astigmatism is also reduced along the main meridian by the variation of the refractive index, this means that the restriction in the design of the ophthalmic lenses that the surface astigmatism along the main meridian respectively along the main line of vision should be low also is eliminated so that the invented ophthalmic lens is not governed by Minkwitz's law and the ophthalmic lens can be designed substantially more favorably considering other aspects.

According to a further embodiment, the variation of the radius of curvature of the intersecting line is, at least in the vicinity of the y respectively the y' axis, such that the radii of curvature increase at least in the reading portion with gaining distance from the y respectively the y' axis, has the advantage that the radii of curvature in the peripheral region of the reading portion become "similar" to the radii of curvature in the distance portion, which may, particularly, be a spherical surface section. By this means, the production of surfaces is further simplified.

According to a further embodiment, the radii of curvature for $x'=O$ is selected in such manner that the saggital refractive power $S'_{sag}$ is practically the same as the meridional refractive power $S'_{mer}$. That is, the increase in refractive power is totally or chiefly borne by the variation in the refractive index; the correction of the astigmatism, however, basically occurs by means of the surface design. This improvement has the advantage that the course of the variation in the refractive index can be realized by comparatively simple technical means.

In accordance with a further embodiment both surfaces are axially symmetrical surfaces and said refractive index n is a function $f(x,y)$, respectively, $F(x', y')$. That is the variation in the refractive index not only produces the increase in refractive power entirely, but also contributes to achieving good imaging quality in the peripheral regions. By imaging quality is meant that astigmatism, distortion, prismatic effects and, in particular, the difference in prismatic power at the points of penetration of the beams of vision in binocular vision, etc., do not exceed certain prescribed values taking physiological aspects into consideration.

In an extreme case, both surfaces of the progressive ophthalmic lens may even be spherical surfaces. Of course, even axially symmetrical aspheric surfaces may also be used so that a favorable central or peripheral thickness-depending on which is the critical thickness - is yielded.

According to other features of the invention, the equations of the variations in the refractive index are provided by means of which the increase in refractive power and astigmatic correction in the region of the main line of vision can be attained. For the refractive index functions contributing to the increase in refractive power and to the correction of astigmatism $$n(x,y) = n(y) + 2n_2(y)^* x^2 / (1 + (1 - \chi(y) + 1) \\ *4n_2^2(y)^* x_2))^{\frac{1}{2}}$$

respectively $$n(x,y) = n(y') = 2n_2(y')^* x_2 / (1 + (1 - \chi(y') \\ + 1)^* 4n_2^2(y')^* x_2))^{\frac{1}{2}}$$

is valid. Further, (y) = constant = 0 is valid. The function n(y) can, by way of illustration, be described by means of spline functions. The equation $$n(y) = a/(b+y) + n_4(y)x_4 + n_6(y)x^2$$

respectively $$n(y') - a/(b+y') = N_4(y')x'^4 + n_6(y')x'^6$$

whereby a and b are constants, being valid, "the material" does not contribute to the astigmatism insofar as the imaging on the front surface is free of astigmatism.

BRIEF DESCRIPTION OF THE DRAWINGS

The present invention is made more apparent in the following section using preferred embodiments with reference to the accompanying drawings, showing:

FIG. 4 illustrates lines of the same refractive index for a first preferred embodiment (FIG. 4a) and a second preferred embodiment (FIG. 4b), FIGS. 6a–c show in table form, the sagitta difference between the surface used in the first preferred embodiment for correcting imaging errors and a spherical surface.

DESCRIPTION OF THE PREFERRED EMBODIMENTS

Figure 1A:
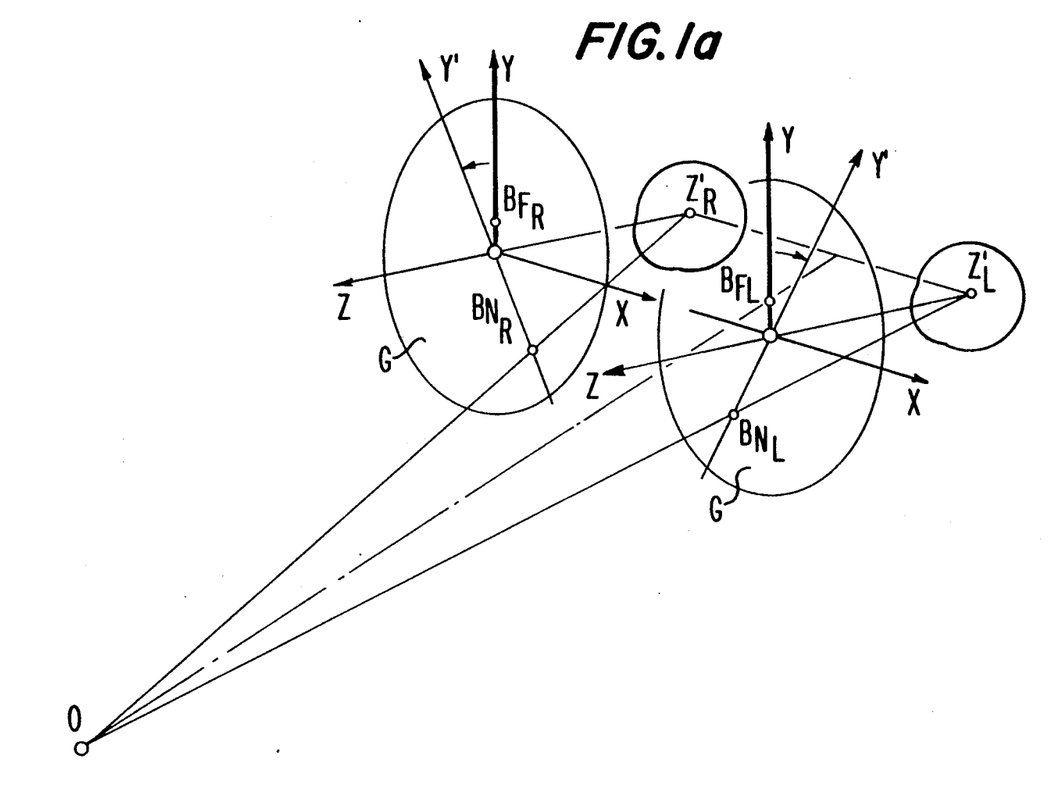
FIG. 1a illustrates two progressive ophthalmic lenses in perspective in front of the left or right eye to explain the terms and values used hereinafter, FIG. 1b a section through a "system" eye/ophthalmic lens.

FIG. 1a depicts the arrangement of two progressive ophthalmic lenses G in perspective in front of the left or right eye A, the optical point of rotation of the eye being designated $Z'_{L\ or\ R}$.

Each progressive ophthalmic lens G is provided with a main point of vision (distance reference point) $B_F$ for distance vision and a main point of vision (near reference point) $B_N$ for near vision. If a fixed space system of coordinates x,y,z is selected for each lens in such a manner that the y axis runs vertically, the x axis horizontally and the z axis through the geometrical center of the lens, the distance reference point $B_F$ lies on the y axis of the respective lens. Due to the convergence of the eye when lowering the glance, however, the near reference point $B_N$ is shifted nasally (toward the nose). In order to make this more apparent, the beams of vision in FIG. 1a are plotted in an object point O lying "straight ahead" in proximity. In order to make allowance for the convergence of the eyes when lowering the glance, it is, therefore, customary to pitch symmetrical lenses an angle typically being between 7° and 10° so that the symmetry axis of a lens in blank tube state coincides with the y' axis in FIG. 1a following being ground for the spectacle frame.

Figure 1B:
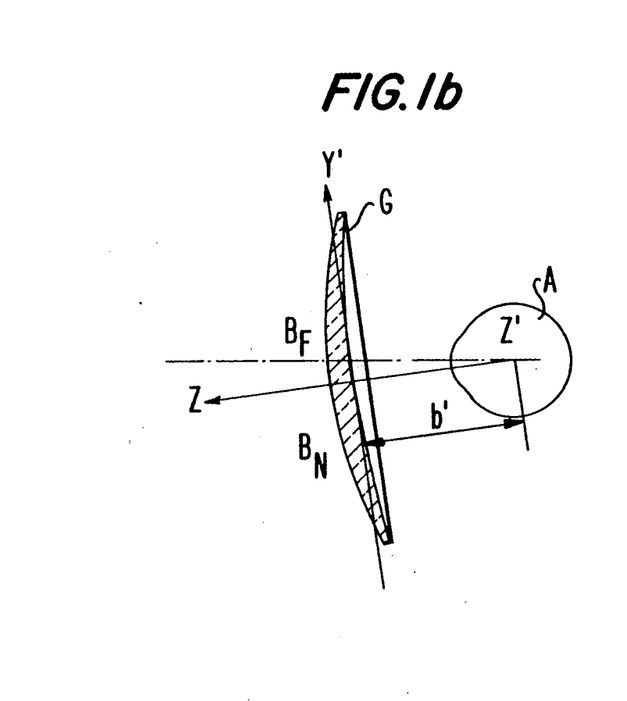

FIG. 1b shows a section through eye A and an ophthalmic lens G arranged in the so-called use position, i.e. an ophthalmic lens in the position in which the ophthalmic lens inserted in a spectacle frame is arranged in front of the eye. In the use position, the lens has a forward pitch, being 8° in the following embodiment. Furthermore, the so-called distance b' from the rotation point of the eye and the distances $y'_{BF}$ and $y'_{BN}$ of the distance or near reference points from the apex of the lens from FIG. 1b are plotted, these values typically being:

$b' = 28.5$ mm $y'_{BF} = 4.0$ mm $y'_{BN} = -14.0$ mm

Figure 2:
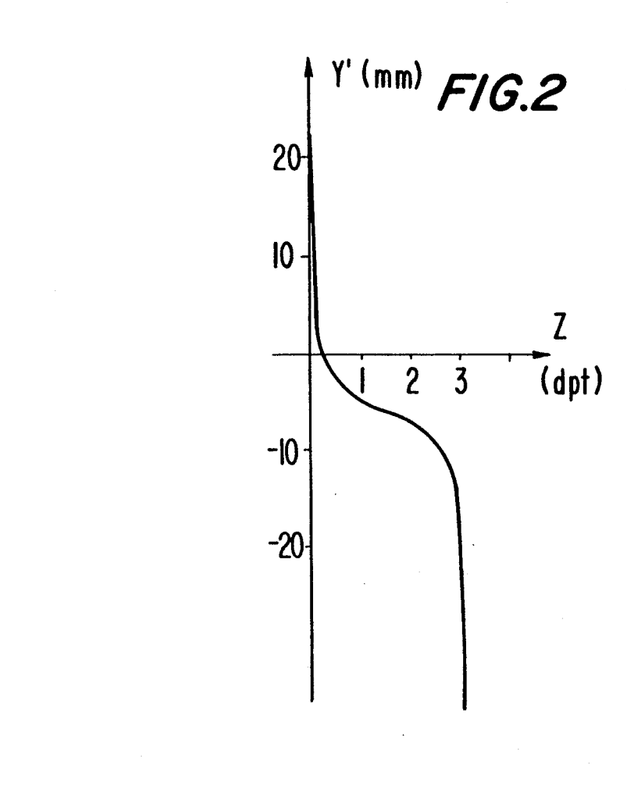
FIG. 2 illustrates the course of the addition z(y') as a function of the coordinate y'.

FIG. 2 depicts a possible course of the addition $z(y')$ for vision through a progressive ophthalmic lens as a function of the coordinate y'. The addition z is the increase of the refractive power to the prescribed refractive power of the distance portion (prescription power): If the refractive power of the distance portion is 2.0 dpt and the addition is 3.0 dpt, the refractive power of the portion is consequently 5.0 dpt. In the course of the addition $z(y')$ illustrated in FIG. 2, the addition inversely corresponds in every point to the reciprocal distance of an object point O (cf. FIG. 1a) measured on the main beam of its point of penetration through the front surface so that no accommodation processes are required when lowering the glance from distance vision to near vision. The course of addition $z(y')$ shown in FIG. 2 may be described by the following equation:

$$z(y') = -z_o(1 - 1/(1 + e^{-c(y'-y_o)}))$$

with
$z_o = 3.0$ dpt
$c = 0.4508$
$y'_o = 0.653$

In the following section the two preferred embodiments of the present invention shall be made more apparent. For the purpose of simplifying the presentation, both preferred embodiments are symmetrical lenses, i.e. their optical and geometrical features are symmetrical to a line to be designated in the following section as the main meridian of the lens. Both preferred embodiments have in common that the course of the addition $z(y')$ depicted in FIG. 2 is solely achieved by varying the refractive index and not by changing the curvature of one or both surfaces along the main meridian so that the main meridian is a circle the radius of which being 118.3 mm in both preferred embodiments.

Furthermore, the following data are the same in both preferred embodiments:

| | |
|---|---|
| distance portion refractive power $S'_{oo}$: | 0.0 dpt |
| addition $z_o$: | 3.0 dpt |
| center thickness $d_m$: | 3 mm |
| refractive index $n_o$ in the geometric central point: | 1.604 |
| surface refractive power $D_2$ of the surface facing the eye with reference to $n_o$: | −5.0 dpt |
| diameter of a lens blank tube: | 66 mm |

Figure 3:
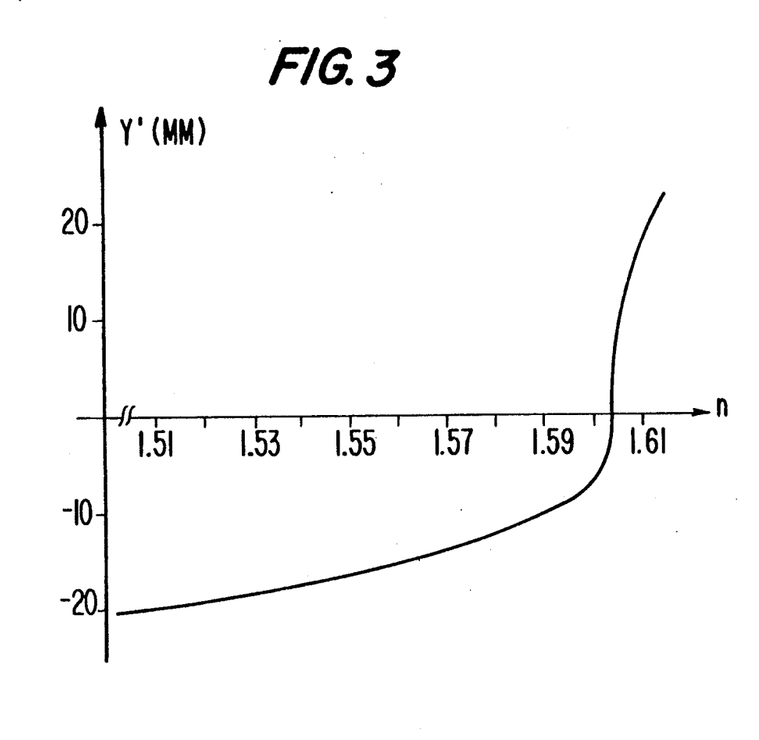
FIG. 3 illustrates the course of the refractive index function as a function of the coordinate y' for x'=0.

In order to realize a course of the addition $z(y')$, the refractive index n is used as a function of the coordinate y' in the course $n(x=0.y')$ given in FIG. 3 for both preferred embodiments.

Figure 4A:
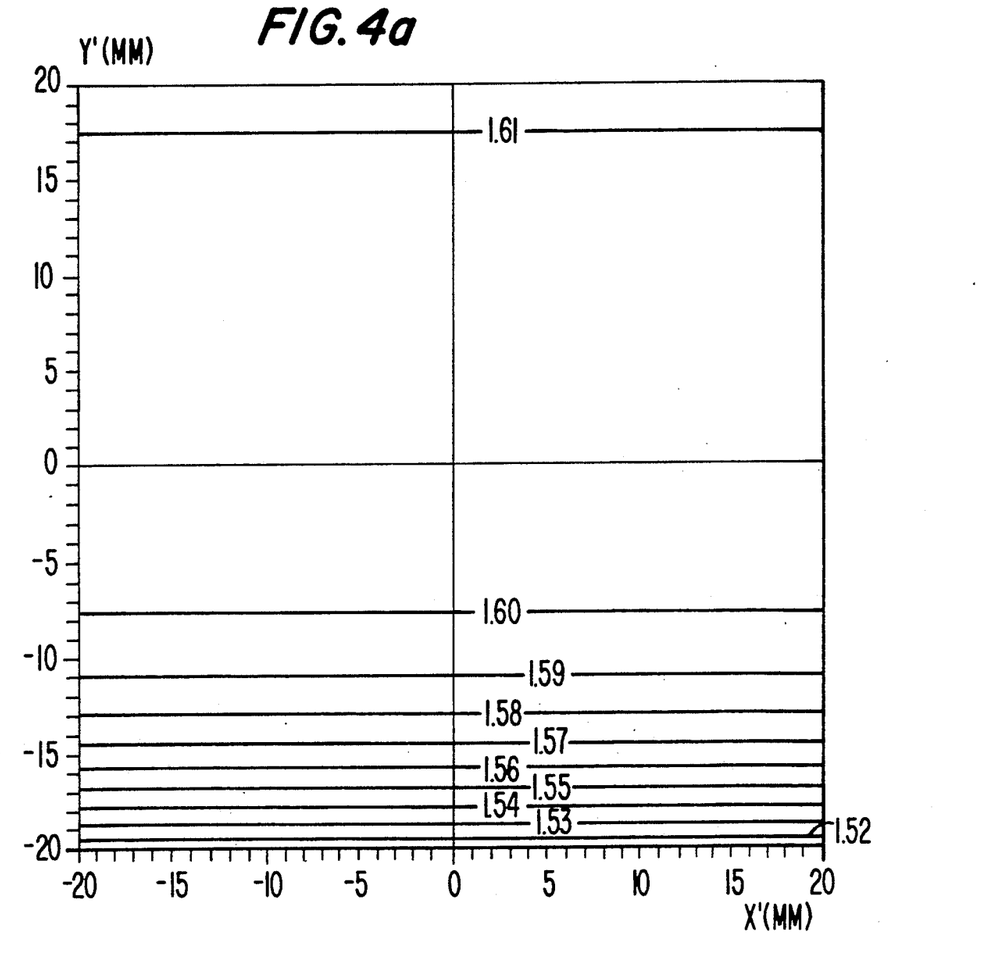

However, the following is the difference between the two preferred embodiments:

In the first preferred embodiment the refractive index function is solely a function of the coordinate y' so that, by varying the refractive index, the increase in refractive power is produced only along the main meridian. The resulting lines of the same refractive index are illustrated in FIG. 4a.

On the other hand, the correction of imaging errors in the regions lateral to the main meridian ensues by means of an appropriate design of a surface, which in the case of the first embodiment is the front surface. The aforecited surface is set up in the aforeillustrated preferred embodiments in such a manner that the intersecting lines of the planes parallel to the x'z plane with the surface used to correct imaging errors are conic sections, the eccentricity of which is a function of y.

Figure 5:
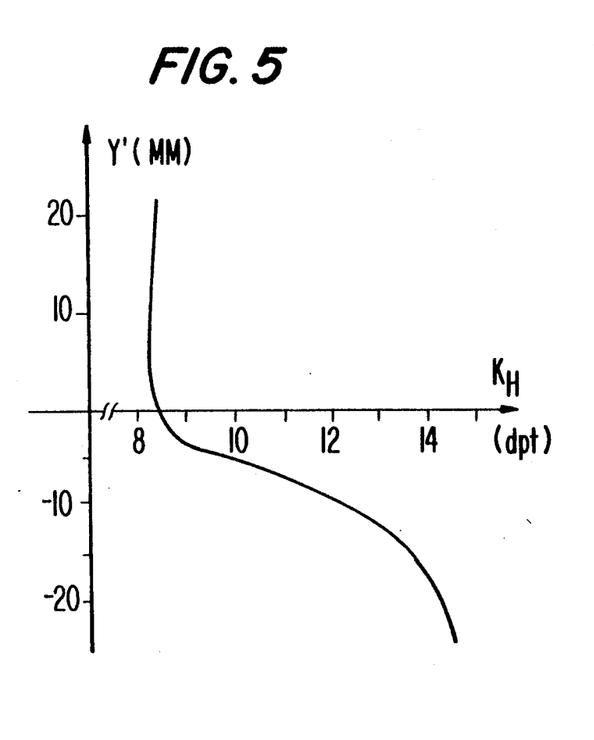
FIG. 5 illustrates the course of the "horizontal curvature" of the main meridian as a function of the coordinate y'.
Figure 6B:
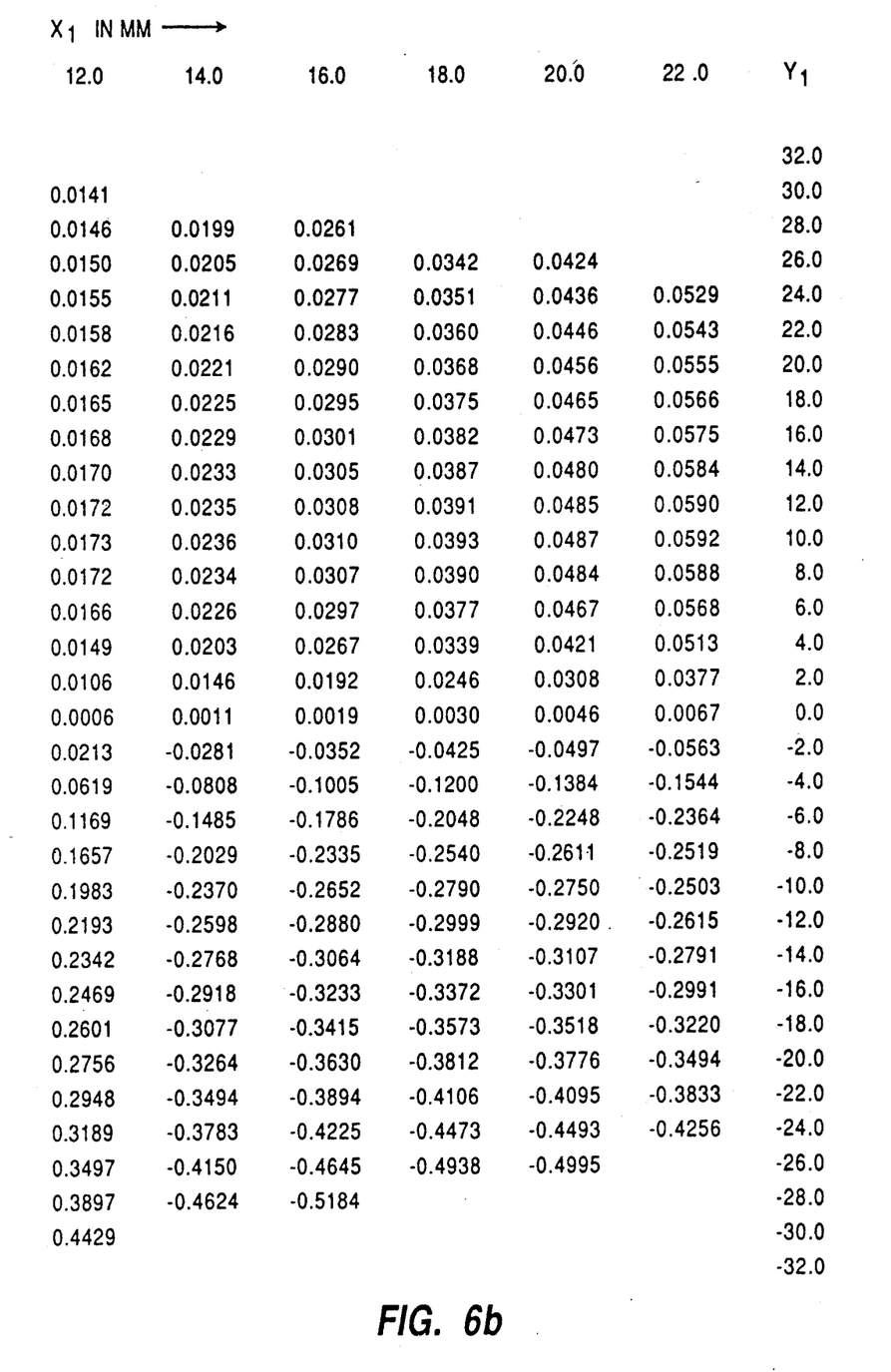
Figure 6C:
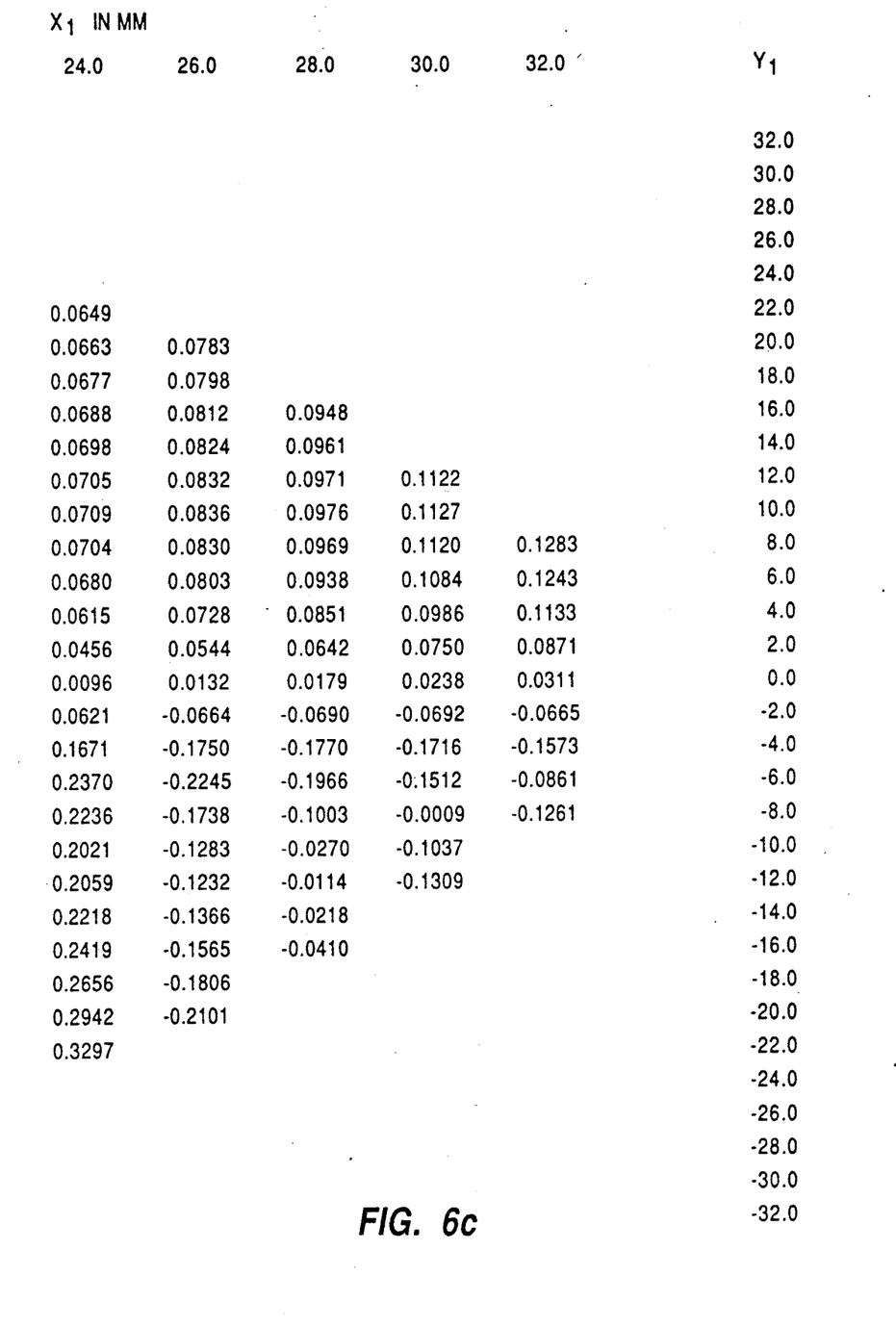

FIG. 5 depicts a course of the curvature (in dpt) of the respective conic sections on the main meridian as a function of y'. FIGS. 6a to c show the difference of the sagittas (in mm) between the invented surfaces used for correcting imaging errors and a spherical surface having a radius, which is the same as the radius of the main meridian. The exact course of the surface can be computed at any time from this table and thus, by way of illustration the y dependency of the eccentricity of the concic sections.

On the other hand, in the second preferred embodiment the refractive index is a function of the coordinates y' and x' so that not only the increase in refractive power along the main meridian, but also the correction of imaging errors on the main meridian are borne by varying the refractive index. Both the front surface and the surface facing the eye are spherical surfaces.

It is expressly pointed out that the correction of imaging errors was not considered in optimization and that nonetheless the result were lenses with very good imaging properties in the lateral regions. A further improvement of the imaging properties in the regions lateral to the main meridian was yielded by further optimization of the index function.

Figure 4B:
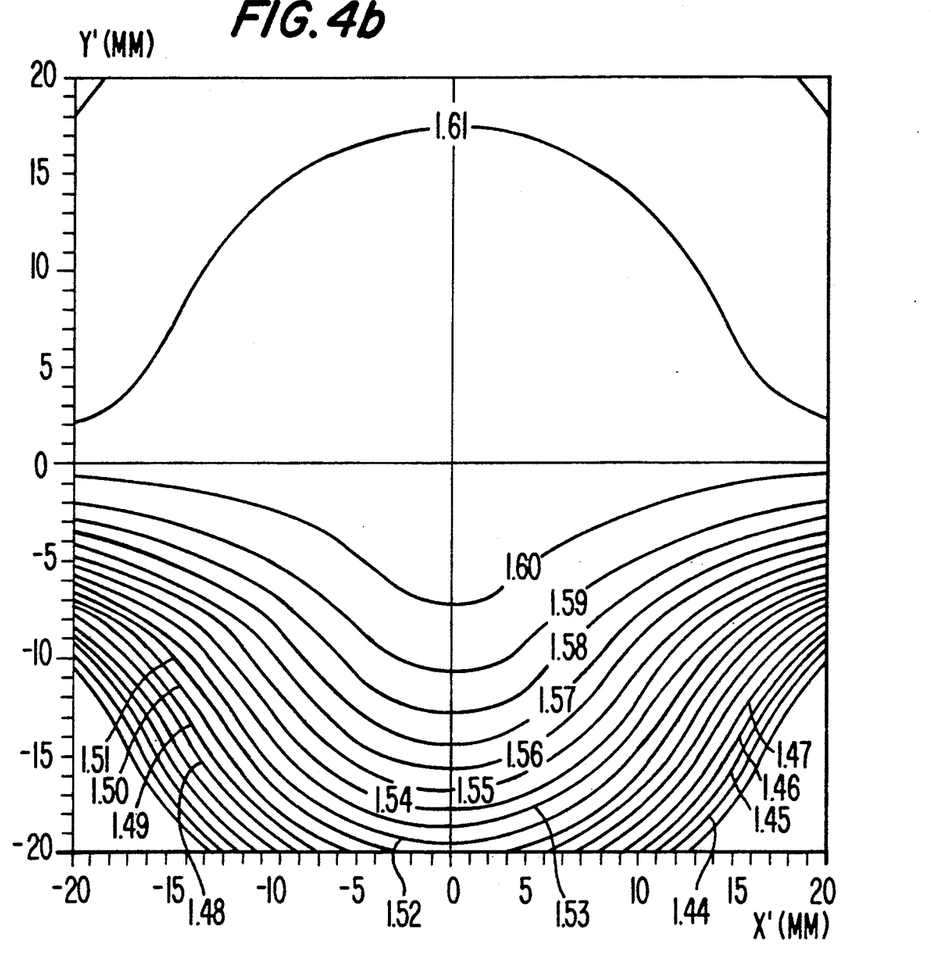

FIG. 4b illustrates the lines of the same refractive index for the second preferred embodiment.

Figure 7A:
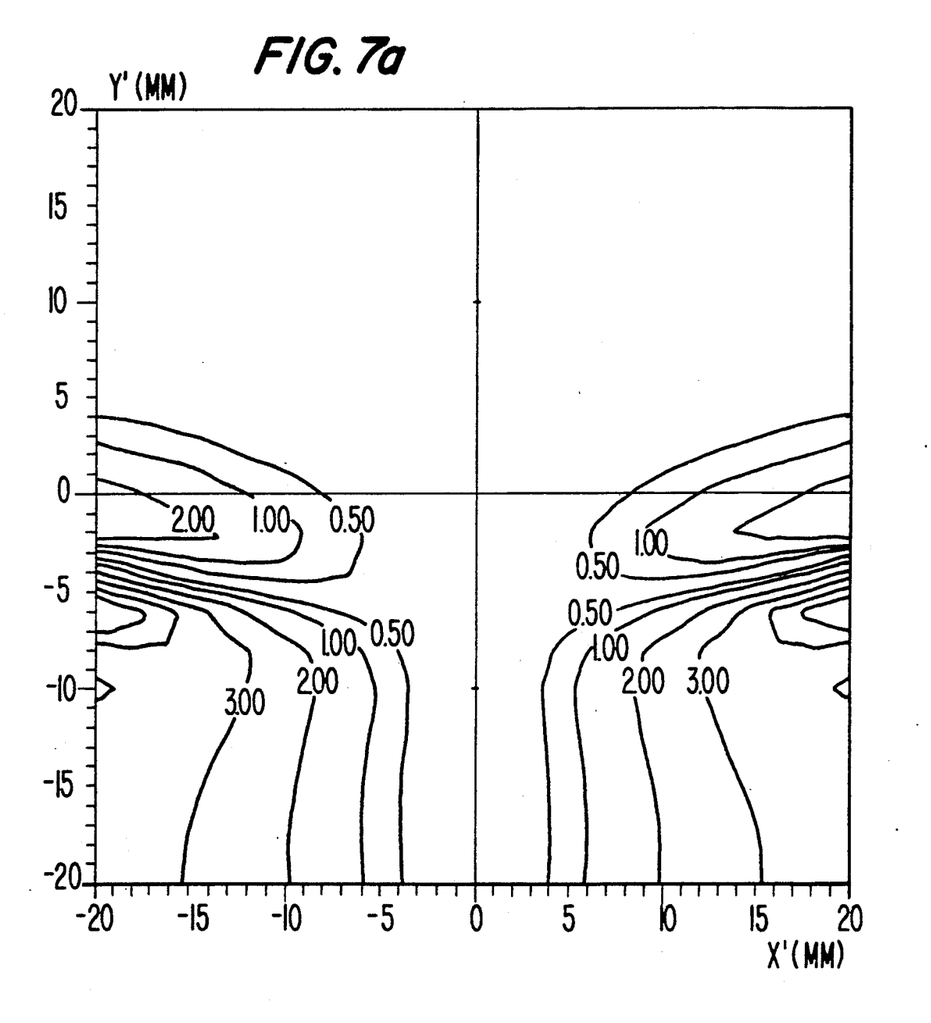
FIGS. 7a and 7b illustrate the deviation from the refraction accuracy for the two preferred embodiments set forth in FIG. 4, FIGS. 8a and 8b the astigmatism for the two preferred embodiments set forth in FIG. 4.
Figure 7B:
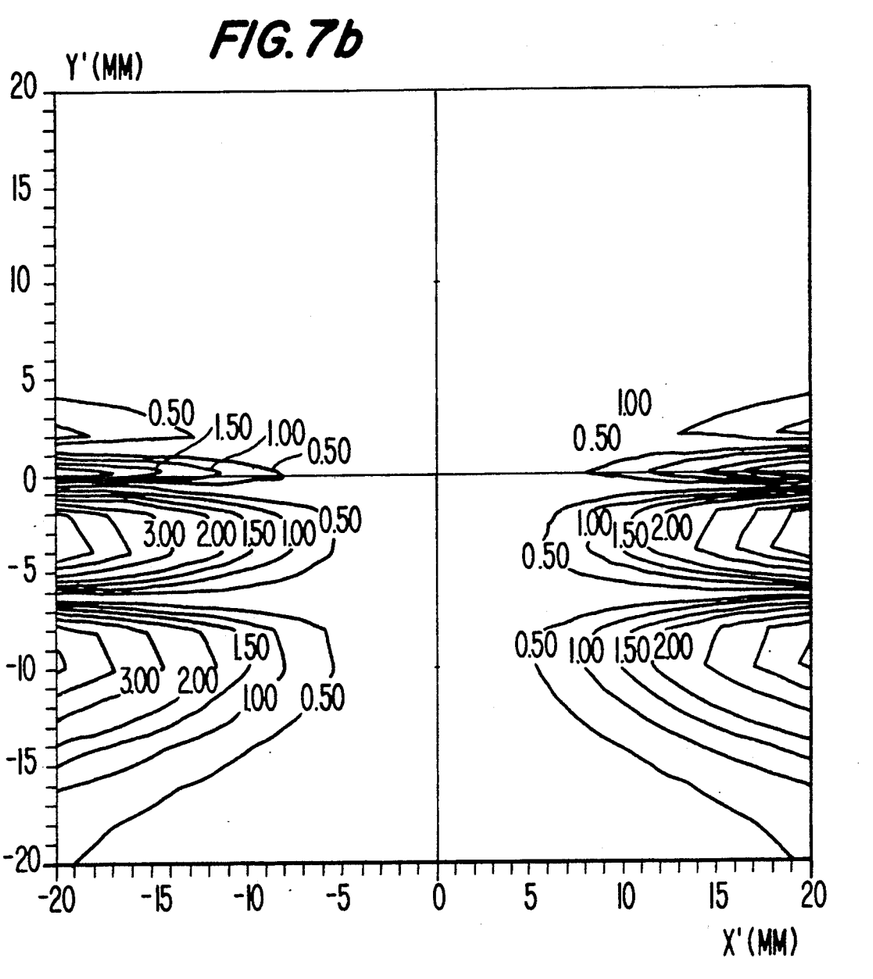
Figure 8A:
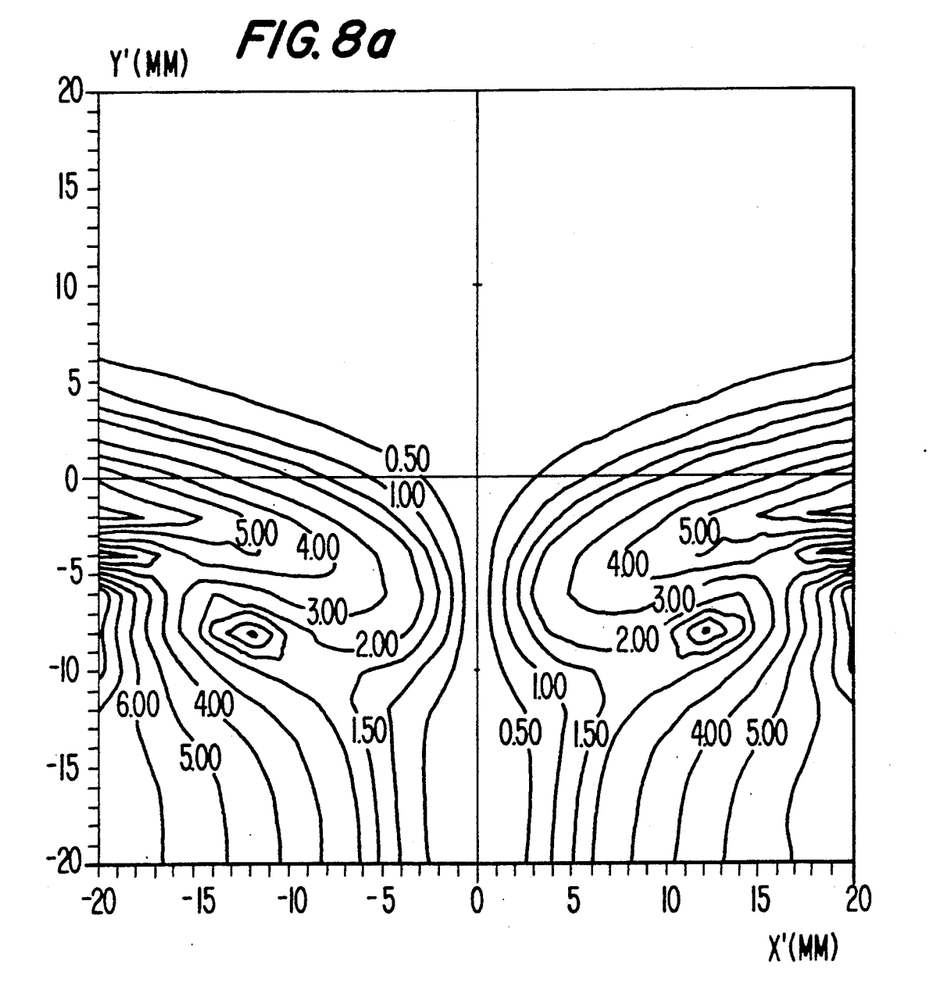
Figure 8B:
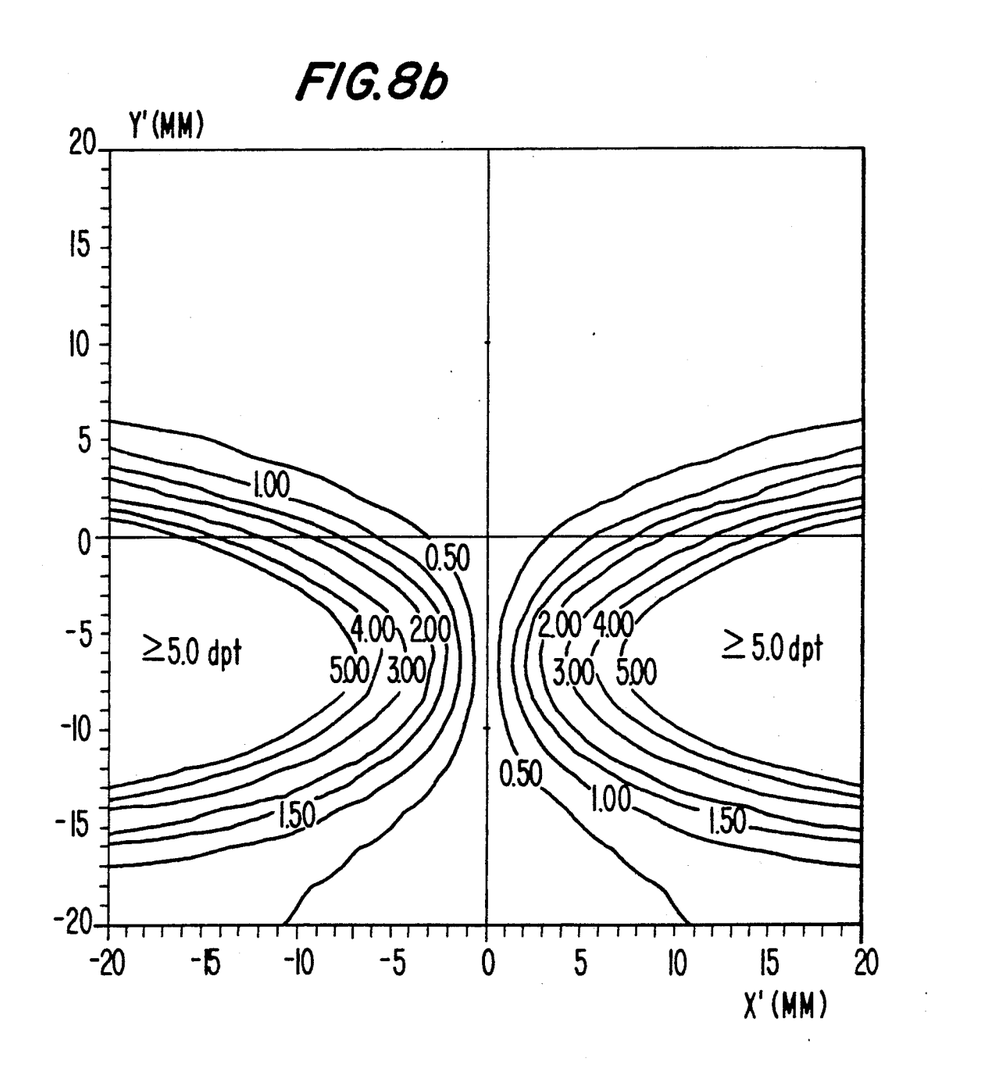

FIGS. 7 and 8 depict the course of the deviation from refraction accuracy and the astigmatism in the use position for both preferred embodiments (sectional FIG. a: first preferred embodiment, sectional FIG. b: second preferred embodiment).

The deviation of the mean refractive power of the ophthalmic lens at a point $x, y_o$ from the prescribed refractive power at the point $O, y_o$ according to FIG. 2 is designated the refraction accuracy.

As can be seen from the figures, a favorable course of the refraction accuracy and of the astigmatism is yielded: the mean refractive power of the invented progressive ophthalmic lens distinctly deviates less in the peripheral regions of the progression zone from the refractive power on the main meridian than is the case with state of the art lenses, in which the increase in refractive power is attained solely by means of the surface design. In particular, a "channel" results in the progression zone in the first preferred embodiment and in the second preferred embodiment three, in which the lines of the constant refractive power stretch horizontally to the edge of the lens. Moreover, the astigmatism in the vicinity of the main meridian is minimal. Especially in the second preferred embodiment, an unusually large reading portion up to 20 mm wide is yielded.

The computation of the aforedescribed preferred embodiments ensued as follows:

For the description of the course of the beams and the imaging properties, such as astigmatism and refraction errors, of an ophthalmic lens having aspheric surfaces and index gradients, initially a main beam from the point of rotation of the eye into the object space must be computed for each pertinant angle of vision while taking the position of the ophthalmic lens in front of the eye into consideration.

In a gradient medium the beam obeys—as, by way of illustration, described by E. W. Marchand in "Gradient Index Optics"—the following differential equation of the second order:

$$\frac{d}{ds}\left(n\frac{dr}{ds}\right) = \nabla n$$

$$\nabla n = \frac{\partial n}{\partial x}e_1 + \frac{\partial n}{\partial y}e_2 + \frac{\partial n}{\partial z}e_3$$

Herein $\vec{e}_i$ are unit vectors of a system of Cartesian coordinates.

A numeric solution for this differential equation is given, by way of illustration, by the Runge Kutta process described by A. Sharma, D. V. Kamar and A. K. Ghatak in J. Opt.Soc.Am., Vol.21 (1982).

The adjacent beams are computed using the same method as for the main beam, proceeding from an object point on the main beam in inverse direction from the main beam in order to determine the imaging properties along the main beam, whereby it is advantageous for optimization if the individual values are described by means of spline functions.

In a solution by means of approximation of the aforedescribed differential equation for the refractive index function is yielded:

$$n(x,y) = n(y) + 2n_2(y) * x^2/(1 + (1-\chi(y)+1)*4n_2^2(y)*x^2))^{\frac{1}{2}}$$

respectively $$n(x,y') = n(y') + 2n_2(y') * x^2/(1 + (1-(\chi(y')+1)*4n_2^2(y')*x^2))^{\frac{1}{2}}$$

Herein $n(y)$, $n_2(y)$ and $\chi(y)$ are functions yielded by the solution of the differential equation. $n(y)$ may in particular be described by means of a Taylor expansion.

In the foregoing the present invention is described using preferred embodiments without the intent of limiting the scope of the overall inventive concept, within which, of course, there are many most varied modifications possible.

What is claimed is:

1. A progressive ophthalmic lens comprising a distance portion having a refractive power designed for distance vision, a reading portion having a refractive power designed for near vision, and an intermediate portion including means for providing a refractive power along the main line of vision which increases the refractive power of said distance portion to said reading portion, said intermediate portion means providing a varying refractive index n of the lens material along said main line of vision at least in said intermediate portion for contributing to the increase in refractive power and to correction of aberrations wherein there is an x axis that is the horizontal axis, a y axis that is the vertical axis, and x' and y' axes when compared to the horizontal and vertical axes, respectively, that are pitched according to the convergence of the pair of axes when lowering the glance for near vision 2. An ophthalmic lens according to claim 1, wherein the refractive index n at least is a function f(y).

3. An ophthalmic lens according to claim 1, wherein said refractive index n at least is a function f(y').

4. An ophthalmic lens according to claim 1 or 2, wherein at least one surface of said ophthalmic lens is provided with intersecting lines y=const, the radii of curvature of which vary for the correction of imaging errors.

5. An ophthalmic lens according to claim 1 or 2, wherein at least one surface of said ophthalmic lens is provided with intersecting lines y'=const, the radii of curvature which vary for the correction of imaging errors.

6. An ophthalmic lens according to claim 5, wherein the variation of the radius of curvature of said intersecting lines is such at least in the vicinity of the y' axis that said radii of curvature become larger with distance from the y' axis at least in said reading portion.

7. An ophthalmic lens according to claim 5, wherein the radii of curvature for x'=0 is selected in such a manner that the saggital refractive power $S'_{sag}$ is practically the same as the meridional refractive power $S'_{mer}$.

8. An ophthalmic lens according to claims 1, 2 or 3, wherein two are axially symmetrical surfaces are provided and said refractive index n is a function f(x,y,) and $$f(x',y').$$

9. An ophthalmic lens according to claims 3, wherein for the refractive index functions contributing to the increase in refractive power and to the correction of astigmatism:

$$n(x,y) = n(y) - 2n_2(y)*x^2/(1 + (1-\chi(y)-1) *4n_2^2(y)*x^2))^{\frac{1}{2}}$$

and $$n(x,y') = n(y') - 2n_2(y')*x^2/(1-(1-\chi(y')-1) *4n_2^2(y')*x^2))^{\frac{1}{2}}$$

10. An ophthalmic lens according to claim 9, wherein (y)=constant =0

11. An ophthalmic lens according to claim 9 wherein $$n(y) = a/(b+y) + n_4(y)x^4 + n_6(y)x^6$$

and $$n(y') = a/(b+y') + n_4(y')x'^4 + n_6(y') x'^6$$

whereby a and b are constants.

12. An ophthalmic lens according to claim 6, wherein the radii of curvature for x'=0 is selected in such a manner that the saggital refractive power $S'_{sag}$ is practically the same as the meridional refractive power $S'_{mer}$.

13. An ophthalmic lens according to 5, wherein for the refractive index functions contributing to the increase in refractive power and to the correction of astigmatism $$n(x,y) = n(y) - 2n_2(y)*x^2/(1 + (1-\chi(y)-1) *4n_2^2(y)*x^2))^{\frac{1}{2}}$$

and $$n(x,y) = n(y') - 2n_2(y')*x_2/(1-(1-(\chi(y') - 1)*4n_2(y')*x_2))^{\frac{1}{2}}$$

14. An ophthalmic lens according to 6, wherein for the refractive index functions contributing to the increase in refractive power and to the correction of astigmatism $$n(x,y) = n(y) + 2n_2(y)^* x^2 / (1 + (1 - \chi(y) + 1) * 4n_2^2(y)^* x_2))^{\frac{1}{2}}$$

and $$n(x,y) = n(y') + 2n_2(y')^* x_2 / (1 + (1 - (\chi(y') + 1)^* 4n_2(y')^* x_2))^{\frac{1}{2}}$$

15. An ophthalmic lens according to 7, wherein for the refractive index functions contributing to the increase in refractive power and to the correction of astigmatism $$n(x,y) = n(y) + 2n_2(y)^* x^2 / (1 + (1 - \chi(y) + 1) * 4n_2^2(y)^* x_2))^{\frac{1}{2}}$$

and $$n(x,y) = n(y') + 2n_2(y')^* x_2 / (1 + (1 - (\chi(y') + 1)^* 4n_1(y')^* x_2))^{\frac{1}{2}}$$

16. An ophthalmic lens according to 8, wherein for the refractive index functions contributing to the increase in refractive power and to the correction of astigmatism $$n(x,y) = n(y) + 2n_2(y)^* x^2 / (1(1 - \chi(y) + 1) * 4n_2^2(y)^* x_2))^{\frac{1}{2}}$$

and $$n(x,y) = n(y') + 2n_2(y')^* x_2 / (1 + (1 - (\chi(y') + 1)^* 4n_2(y')^* x_2))^{\frac{1}{2}}$$

17. An ophthalmic lens according to claim 9, wherein $$n(y) = a/(b+y) + n_4(y)x^4 + n_6(y)x^6$$

and $$n(y') = a/(b+y) + n_4(y')x'^4 + n_6(y')x'^6$$

where a and b are constants.

18. An ophthalmic lens according to claim 1, wherein said intermediate portion means enables correction of astigmatism as a correction of aberrations.

* * * * *